Aug. 30, 1960     F. H. GROEN, JR     2,950,904
JACKETED KETTLE MOUNTING ASSEMBLY

Filed July 15, 1957     2 Sheets-Sheet 1

INVENTOR
Fred H. Groen, Jr.

BY Pierce Scheffler & Parker
ATTORNEYS

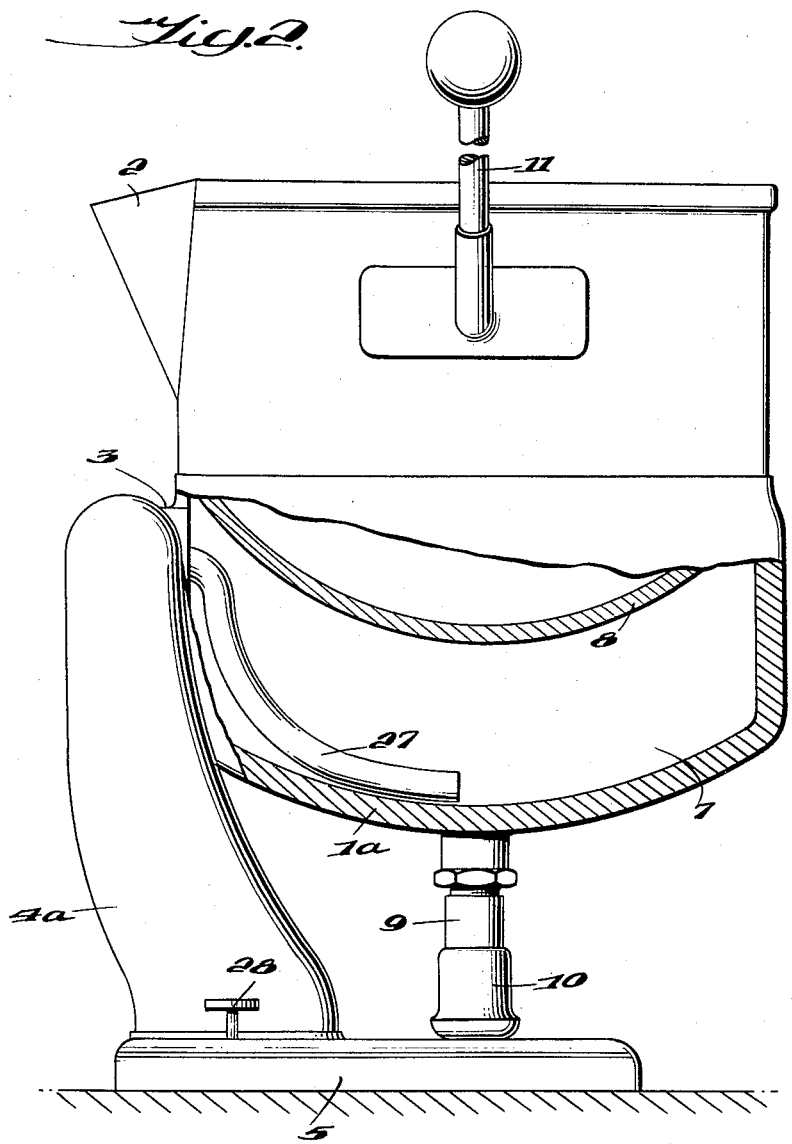

2,950,904
JACKETED KETTLE MOUNTING ASSEMBLY

Fred H. Groen, Jr., Chicago, Ill., assignor to Groen Mfg. Co., Chicago, Ill., a corporation of Illinois Filed July 15, 1957, Ser. No. 671,754

1 Claim. (Cl. 257—1)

This invention relates generally to steam-jacketed table kettles, and more particularly to pivotal mounting means for steam-jacketed kettles having pouring trunnions at the forward wall thereof.

Deep-type jacketed tilting table kettles are well-known in the food cooking and warming utensil art. Rigid city and state health requirements control apparatus utilized in the preparation of fresh and frozen vegetables, in the cooking of small batches of gravies, puddings, sauces and soups, and in the heating of foods in restaurants, hospitals, hotels and institutions. These known types of jacketed kettles are relatively bulky and space consuming, require expensive maintenance, and are prone to accidental dumping with accompanying hazardous results. Thus the mounting assembly for steam jacketed kettles of the present invention was developed to avoid the disadvantages presented by the known apparatus of the prior art.

The primary object of my invention is to provide a compact, space-saving pivotal mounting for steam jacketed kettles in which the pouring trunnions are mounted adjacent the forward portion of the kettle wall.

Another object of my invention is to provide a trunnion assembly for steam jacketed kettles which will result in an elevated pouring height when the kettle is tilted forwardly about its trunnions 90° from the vertical.

Still another object of my invention is to provide a steam jacketed kettle trunnion assembly which makes it impossible to accidentally dump the kettle without requiring mechanical locking means or the like.

A further object of my invention is to provide a mounting assembly for steam-jacketed kettles having trunnions at the forward portion of the wall supported by vertical legs having steam inlet and condensate return passages therein, said assembly including lifetime rotary seals for reduced maintenance costs and added sanitation.

Other objects and advantages of my invention will become more apparent from a study of the following specification when considered in conjunction with the accompanying drawings, in which:

Fig. 2 is a partially-sectioned side elevational view of the apparatus.

Figure 1:
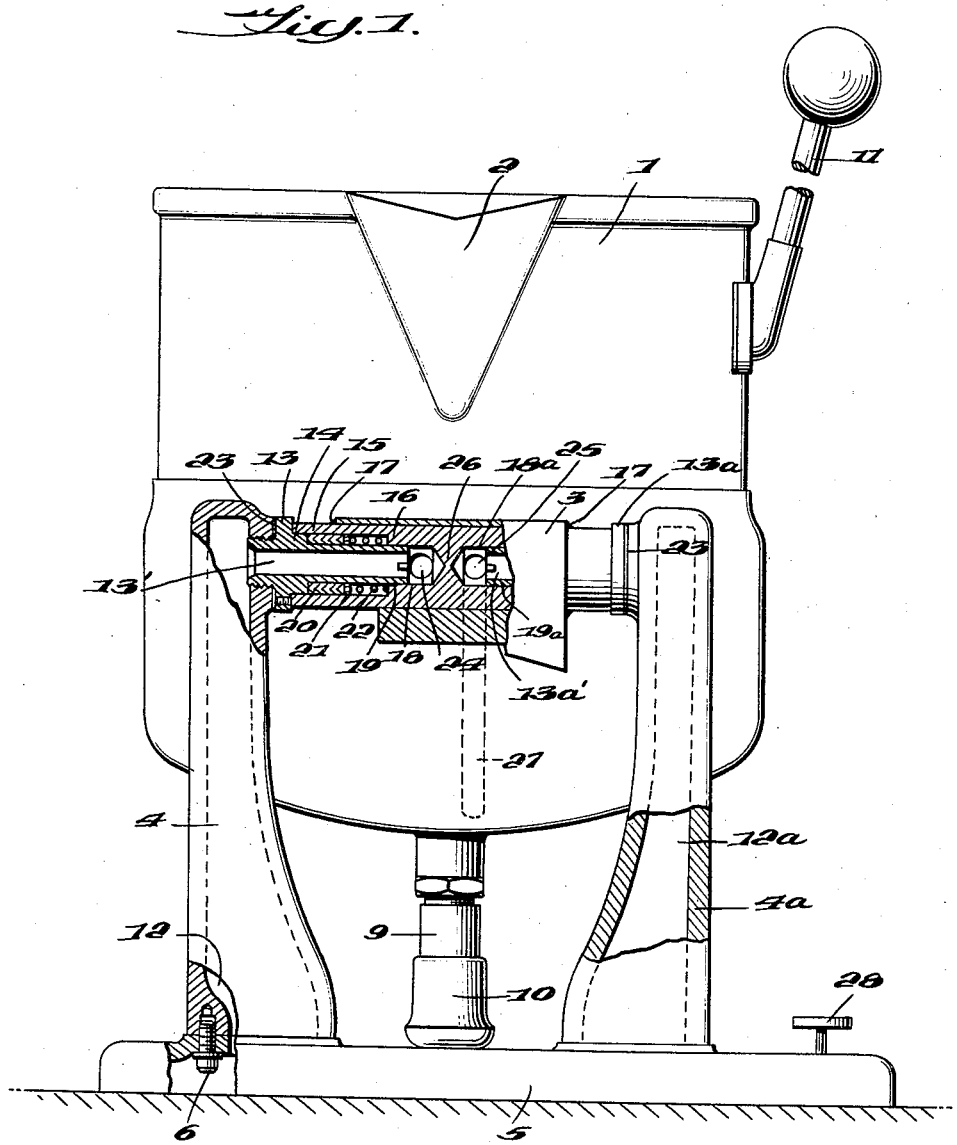
Fig. 1 is a partially-sectioned front elevational view of my kettle.

According to my invention the deep-type, jacketed, tilting table kettle 1 having a wide V-shaped pouring spout 2 is pivotally connected by a trunnion assembly 3 to two pedestal legs 4, 4a secured to the stationary supporting base 5 by bolt means 6. The kettle is formed from a suitable heat resistant material, such as stainless steel, and has a jacketed bottom compartment 7 intermediate the receptacle bottom 8 and the kettle bottom portion 1a (Fig. 2). In addition to the trunnion connection 3 of the kettle to the pedestal legs, the kettle is supported above the base 5 by means of a leg 9 threadably connected at its upper end to the kettle bottom and having at its lower end a leg bumper 10 made from a suitable resilient material such as India rubber or the like. Arm 11 welded or bolted to the outer wall of the kettle provides means for tilting the jacketed kettle forwardly about its pivotal trunnion mounting.

It will be noted from Fig. 2 that the trunnion assembly 3 is located at the forward portion of the kettle wall intermediate the pouring spout and the kettle bottom. As will be explained in greater detail below, such a location of the trunnion assembly results in an elevated pouring height.

As shown in Fig. 1 the pedestal legs 4, 4a have passages 12, 12a, respectively, vertically extending therein. Threadably secured in threaded bores in the upper wall portions of the pedestal legs are socket cups 13, 13a having first longitudinal tubular portions 19 and second tubular portions 14 of larger diameter. Pivot shaft 16 extends through the bore of the trunnion sleeve 3 and is rigidly connected thereto by means of welded seams 17. Each end of pivot shaft 16 has independent aligned longitudinal bore chambers therein, said bore chambers widening towards the ends of the pivot shaft 16 from first bore portions 18, 18a to cylindrical second bore portions of larger diameter (only the left-hand second bore portion 15 being shown in Fig. 1). As seen in Fig. 1, the first socket tubular portions 19, 19a are journalled in the first bore portions 18, 18a, and the second socket tubular portions 14 are journalled in the pivot shaft second bore portions 15. Mounted concentrically about the sleeves 19, 19a within the pivot shaft bores 15 are rotary endless packing rings 20 of raybestos or other suitable material which are compressed against the ends of the projecting portions 14 by means of washers 21 and coil springs 22, which rotary packing rings serve to provide a fluid seal between the socket cups and their projecting tubular extensions and the cooperating tubular wall portions of the pivot shaft bores 15. Gaskets 23 intermediate the pedestal legs and the socket cups 13, 13a provide similar fluid sealing means. Bore 13' extends longitudinally through socket cup 13 and its tubular extensions 14 and 19, and bore 13a' extends longitudinally through socket cup 13a and its tubular extensions 14a and 19a.

The pivot shaft independent bore chambers 18, 18a are separated by the transverse wall 26; each chamber is in communication with the jacketed heating compartment 7 by means of transverse bores 24, 25 respectively which extend through the kettle wall. Thus the steam heating fluid under pressure of on the order of five to forty-five pounds is conducted through the vertical passage 12 in pedestal leg 4, through the bore 13' of the socket cup 13 and its projections 14 and 19, and through bore chamber 18 and bore 24 to the kettle jacketed bottom compartment 7. Connected at one end to the bore 25 opening into the bottom heating compartment 7 is the condensate return pipe 27 which, as shown in Fig. 2, extends along the kettle bottom 1a and has an unobstructed opening at its free end. The pressure of the steam heating fluid is generally sufficient to force the liquid condensate through the return pipe 27, through bore 25 and bore 18a, and through the bore 13a' of socket cup 13a and vertical return passage 12a in the pedestal leg 4a. If desired, suction means may be utilized in combination with the condensate return pipe 27 to assist in the removal of the liquid condensate from the jacketed heating compartment 7. Valve means 28 associated with the table kettle base provides means for controlling the supply of steam to the supply passage 12.

When the kettle is pivoted forwardly 90° about its elevated trunnions by means of lever 11, pivot shaft 16 secured thereto will pivot about the tubular projections 14, 19, 14a and 19a of socket cups 13 and 13a. Packing seal 20 is free to rotate upon relative movement between pivot shaft 16 and the stationary socket cup journals and serves to provide sealing means preventing escape of steam from the bore chambers 18 and 18a. The springs 22 serve to constantly compress the packing seals and urge the same radially outwardly into engagement with the inner walls of the pivot shaft second bores 15. Due to the fact that the elevated clearance between the pouring spout and the base when the kettle is tilted to its pouring position is equal to height of the pedestal legs, the unit may be readily installed on existing flat top steam tables and hence special tables with special step-down fabrication are not necessarily required.

Also, due to the reduced distance between pedestal legs at the forward portion of the kettle according to the instant invention, as opposed to the diametrically opposite location of the legs in the kettles of the prior art, a savings of overall width required for the kettle would be on the order of 30%. The kettle has a lower overall height and yet an advantageous elevated location of the spout when the kettle is tilted to its pouring position. While the kettle trunnion assembly was designed primarily for kettles of the 10 to 20 quart capacity size, the principles of the invention are applicable to kettles of considerably larger capacities.

While in accordance with the provisions of the statutes I have illustrated and described the best embodiment of my invention now known by me, it will be apparent to those skilled in the art that other changes and improvements might be made in the apparatus described without departing from the scope of my invention as set forth in the following claim.

What I claim is:

Pedestal-supported trunnion means adapted for use with a vessel having bottom and side walls and an outer wall spaced from at least one of said bottom and side walls to define a jacketed compartment comprising a unitary horizontal generally-cylindrical pivot shaft, the ends of said pivot shaft having independent aligned longitudinally-extending bore chambers therein, each of said bore chambers having a first cylindrical bore portion adjacent the center of the pivot shaft and widening toward the end of the pivot shaft in a second bore portion of larger diameter than the diameter of said first bore portion, the pivot shaft walls defining each of the first bore portions having at least one lateral opening therein extending completely therethrough and communicable with an opening in the outer wall of said vessel to provide communication between the pivot shaft first bore portion and the vessel jacketed compartment; a socket cup at each end of said pivot shaft, each of said socket cups having a first tubular portion journalled in and partially extending into the pivot shaft first bore portion, a second tubular portion of greater external diameter journalled in and partially extending into the pivot shaft second bore portion, and a longitudinal bore extending completely through the first and second tubular portions; and spring-biased rotary packing seal means in the second bore portions of said pivot shaft concentrically surrounding the first tubular portions of said socket cups; said socket cups each being rigidly and non-rotatably connected to hollow pedestal support means with the longitudinal bores of the socket cups in communication with the associated passages in the pedestal support means so that at one end of the pivot shaft fluid may pass through one pedestal passage, through the bore of the associated socket cup, and out of the pivot shaft first chamber portion into the jacketed compartment of the vessel through the opening in the wall thereof, and fluid may pass from the jacketed compartment of the vessel into the first bore portion at the other end of said pivot shaft through the associated wall opening, through the bore of the associated other socket cup, and through the other pedestal passage.

References Cited in the file of this patent

UNITED STATES PATENTS

| 343,234 | Farrell | June 8, 1886 |
| 376,084 | Ganter | Jan. 10, 1888 |
| 1,460,105 | Malone | June 26, 1923 |
| 1,993,779 | French et al. | Mar. 12, 1935 |
| 2,511,261 | Heinrich | June 13, 1950 |

FOREIGN PATENTS

| 647,189 | Great Britain | Aug. 30, 1948 |